No. 800,131. PATENTED SEPT. 26, 1905.
A. J. BALDWIN.
MACHINE FOR MAKING WIRE GLASS.
APPLICATION FILED OCT. 18, 1904.
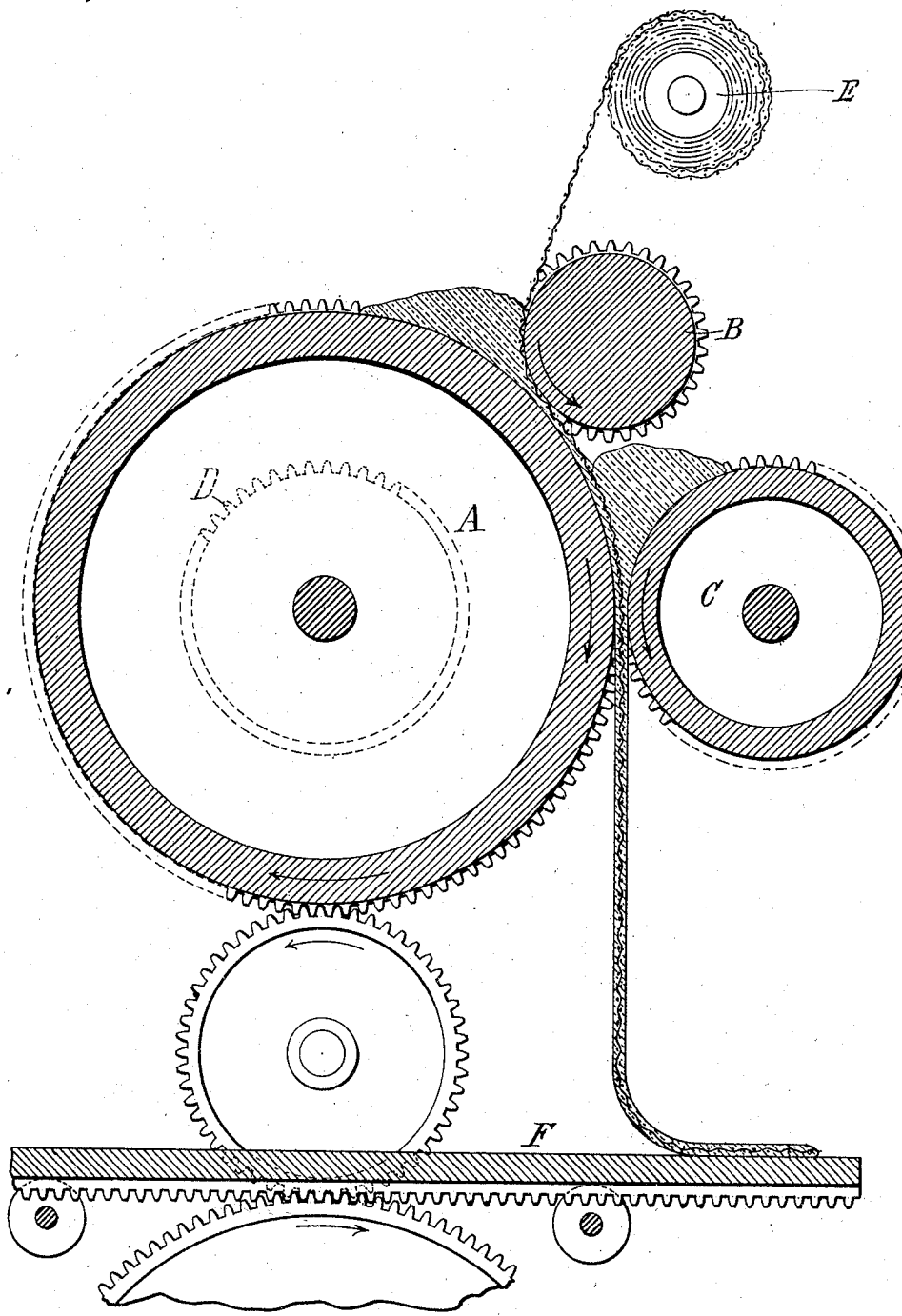
Witnesses
Raphael Netter
A. S. Dunham
Inventor
Arthur J. Baldwin
By his Attorneys
Kerr, Page & Cooper

UNITED STATES PATENT OFFICE.

ARTHUR J. BALDWIN, OF EAST ORANGE, NEW JERSEY.

MACHINE FOR MAKING WIRE-GLASS.

No. 800,131.     Specification of Letters Patent.     Patented Sept. 26, 1905.

Application filed October 18, 1904. Serial No. 229,036.

*To all whom it may concern:*

Be it known that I, ARTHUR J. BALDWIN, a citizen of the United States, residing at East Orange, in the county of Essex, State of New Jersey, have invented certain new and useful Improvements in Machines for Making Wire-Glass, of which the following is a specification, reference being had to the drawing accompanying and forming a part of the same.

My invention is an improvement in apparatus for the manufacture of what is commercially known as "wire-glass" or glass in the form of sheets with a wire fabric or netting embedded therein, and has for its object the provision of mechanism of more simple construction and capable of easier and more economical operation than that heretofore employed in this art.

My improved apparatus embodies, broadly, the principles of construction and operation of those used in the manufacture of wire-glass and by means of which two layers of glass are simultaneously and progressively formed and incorporated with a wire fabric— such, for instance, as the Appert apparatus shown in Patent No. 608,096, of July 26, 1898; but in carrying out my invention I dispense with a bed or table as the surface upon which the composite plate is formed in part or in whole and employ a system of revolving rolls between and by the operation of which the two layers of glass are simultaneously and progressively formed and successively associated with the wires or fabric. This apparatus I have illustrated in the accompanying drawing, which is a vertical cross-sectional view of such parts as are necessary to a clear understanding of the improvement.

A designates a cylindrical roll or drum which may be of relatively large diameter, mounted in suitable bearings and adapted to be rotated at a definite speed. B is a second roll, which may be of considerably smaller diameter, similarly mounted with the capability of rotation at the same peripheral speed as the first and mounted so that the space between the two will be equal to one layer or approximately one-half the thickness of the finished sheet which the apparatus is designed to produce. C is a third roll as near to roll B as practical conditions of operation will permit and, for convenience, of somewhat larger diameter. It is mounted with relation to roll A so as to leave a space between the two approximately twice as great as that between A and B—that is to say, equal to the thickness of the finished sheet—and suitable means are provided for driving it with a peripheral speed equal to that of the other rolls.

In the drawing I have indicated the usual means for imparting rotation to the several rolls by cog-wheels D on the shafts of the latter, which are shown in dotted lines.

Of course in practice some well-known appliances for regulating or controlling the temperature of the rolls may be employed whenever this is found necessary or desirable.

In using this machine a suitable length of wire netting or fabric wound on a reel E is drawn down between the two rolls A and B, and a batch of molten or plastic glass is deposited above and between the rolls A and B and a second batch between A and C and all three rolls driven with substantially the same peripheral speed. By this means a layer of glass of the desired thickness is formed between the rolls A and B, into the surface of which the web of wire fabric is impressed. A second layer of glass is formed and applied on the opposite side of the fabric by the action of the rolls A and C and a composite plate thus formed which by reason of the conditions under which it is formed issues as a solid homogeneous sheet in perfect condition for annealing and which when cooled is free from checks and cracks. The sheet as it issues from the rolls A and C may be received on a transversely-moving table F or on any other suitable device by which it may be conveniently transferred to the annealing-furnace. I have shown in the drawing the rolls so mounted that the sheet issues vertically from between them; but this is not essential.

An important advantage of the apparatus above described is manifestly the capability of producing sheets of wire-glass in any desired lengths without corresponding increase in expense. The use of long and expensive rolling-tables is thus obviated, and the control of the temperature of the surfaces with which the molten glass comes in contact is very greatly facilitated.

I am aware that it has been proposed to manufacture wire-glass by forming separately between rolls two layers of glass and to feed a wire fabric between them as they are brought together and compressed by the rolls into a solid sheet; but no means have ever been devised by which such a process could be practically carried out for the manufacture of wireglass of commercial quality. The main reason for this is that the exposed surfaces of the layers of glass cool to such an extent in passing from the forming-rolls to the point of union with the wire fabric that the proper consolidation of the three elements cannot be effected, and the composite sheet is inevitably defective by reason of the presence therein of checks, cracks, and other imperfections. By the use of my improved apparatus, however, all the advantages of the table or bedplate machines are secured. The wire fabric is associated with one layer of glass while it is still in the molten state, a step which is essential to practical success, while at the same time the second layer is applied sufficiently soon to produce a composite sheet of glass having the wire fabric in its center. Thus while the operation of forming the two layers of glass and applying them to opposite sides of the wire fabric are in a sense successive they are effected in such way as to be substantially simultaneous in their effect upon the quickly-cooling glass, resulting in a practically homogeneous product.

Having now described my invention, what I claim is—

1. In an apparatus for manufacturing wireglass, the combination of rolls for forming a layer of glass from a molten batch deposited above and between them, means for feeding a wire fabric between said rolls whereby the fabric will be embedded in the surface of the layer, and rolls for receiving the wired layer and forming a second layer from a molten batch upon the wired surface of the first layer, as set forth.

2. The combination in a wire-glass machine with a roll A of relatively large diameter, of a roll B separated therefrom by a space equal to the thickness of one layer, a roll C beneath the roll B and separated from roll A by a space equal to the thickness of the finished sheet, all of said rolls being adapted to be driven with the same peripheral speed, and means for feeding a wire fabric between said rolls, as set forth.

ARTHUR J. BALDWIN.

Witnesses:
M. LAWSON DYER,
S. S. DUNHAM.